UNITED STATES PATENT OFFICE.

LEWIS A. LEONARD, OF NEW YORK, AND JESSE P. LARRIMER, OF BROOKLYN, NEW YORK.

PROCESS OF PRODUCING A METAL OF HIGH GRADE FROM A METAL OF LOW GRADE.

970,728.

Specification of Letters Patent. Patented Sept. 20, 1910.

No Drawing. Application filed September 17, 1909. Serial No. 518,152.

*To all whom it may concern:*

Be it known that we, LEWIS A. LEONARD, a citizen of the United States, and a resident of New York city, in the county and State of New York, and JESSE P. LARRIMER, a citizen of the United States, and a resident of Brooklyn, in the county of Kings and State of New York, have invented certain new and useful Improvements in Processes of Producing a Metal of High Grade from a Metal of Low Grade, of which the following is a specification.

The invention relates to improvements in the art of producing a high grade steel from a low grade of steel.

Our invention pertains to methods of treating low grade steel whereby without reducing the same to a molten state or changing its material shape or proportions, we very greatly improve and change the character of the same, the low grade steel, such as a steel which runs from nine to twelve points of carbon, being converted into a high grade of steel adapted for lathe tools, chisels, vault plates and the like.

The invention comprises methods whereby the quality of steel, whether the same be in the form of bars, sheets, or other commercial shapes, may be very greatly improved and the degree of hardness and toughness imparted to the steel varied as the conditions or circumstances of its intended use may require.

Our invention comprises as one important feature, the treatment of a piece of steel without reducing it to a molten state, whereby the steel becomes conditioned for the further step or steps of the process in which it is subjected to the action of carboniferous material, such carboniferous substance being first, burnt leather, or burnt bone, or other highly carboniferous material within a bed of which the steel is subjected to a baking process, and second, an element or elements in a cold bath in which the steel, then hot, is immersed or quenched for a period varying with the degree of hardness or toughness required.

The first step in the treatment of the steel for its conversion into a higher grade is to condition the steel for the further step or steps of our process, and in carrying out this first step of the process we subject the pieces of steel to a baking in a closed metal box or holder containing a body of material in which the pieces of metal are embedded and which comprises a suitable substance or substances which so act upon or co-act with the steel during the baking step that the metal is conditioned or rendered susceptible to the action of the subsequent step or steps of the process. The body of material in which we prefer to bake, in an air-tight box or holder, the pieces of steel comprises hydrated oxid of iron, silica and a small percentage of phosphorus, there being approximately about 25% of hydrated oxid of iron and approximately about 75% of silica. The percentage of phosphorus may be about one-half of one per cent. The proportions mentioned may, of course, vary with the thoroughness with which the process may be carried out. We have used the materials named in about the proportions stated with entire success in the treatment of steel. We have found that the ingredients just named and in about the proportions given are present in some low grades of iron ore which we have used with entire satisfaction in carrying out our process, and while we prefer to use the substances as found in nature, we do not wish to confine our invention to such use, nor to the specific ingredients named. The pieces of steel embedded in the material indicated and confined within a closed box or holder, are baked in a retort of usual or any suitable construction at a uniform heat for from about three to about fifteen hours, the time varying with the thickness of the pieces and the degree of thoroughness with which it may be desired to carry out the process, and the degree of heat employed being sufficient to bring the pieces to and maintain them at about a cherry-red color or from about six hundred to eight hundred degrees Fahrenheit according to the character and thickness of the pieces. The effect of the baking of the pieces of steel is that the steel becomes transformed or conditioned to readily yield to or become affected by the further step or steps of the process.

After the baking process or step hereinbefore described has been completed the steel is removed from the box or holder in which it was baked and packed in a similar box or holder with some highly carboniferous material, such as burnt leather and burnt bone, and subjected to a further baking for a period of about one-half of that occupied in the first baking, the heat being sufficient to maintain the steel at about a cherry-red color, as in the first baking. The steel is prepared by the first step of the process to eagerly and efficiently take up or become affected by the carbon in the second step of the process, and after said second step has been completed the steel is quenched in a cold bath of water in which has been incorporated material suitable for hardening or toughening the same; such bath containing, for illustration, sulfate of lime, preferably granulated, and ferric oxid mixed with powdered charcoal, ground burnt bone or other carboniferous material, in the preferred proportions of about ten per cent. of the carboniferous material to ninety per cent. of the ferric oxid, by weight. The proportion of sulfate of lime used in the bath is equal to about six per cent. of the total weight of the ferric oxid and carboniferous material. The degree of hardness or toughness imparted to the steel by the bath will depend on the length of time it remains in the bath; by allowing the steel to remain in the bath until the latter can act through the thickness of the piece, the latter becomes hardened throughout to a remarkable degree and becomes converted or changed from a steel of low grade to a steel of high grade.

Our invention renders it entirely practicable to harden pieces of steel throughout to a maximum degree, or to vary the degree and depth of the hardening as circumstances may require.

The result of our process is that by it we thoroughly convert or transform steel from a low grade to a steel of high grade and that at the same time we may secure a degree of hardness extending entirely through the metal not attained heretofore by any processes known to us.

What we claim as our invention and desire to secure by Letters Patent, is:

1. A process of treating steel for converting it from a low grade to a high grade, which comprises the baking of the steel in a closed holder in the presence of a substance preparing the metal to be successfully acted on by carbon, and then subjecting the steel to a baking in the presence of carboniferous material, and finally quenching the steel in a bath.

2. A process of treating steel for converting it from a low grade to a high grade, which comprises the baking of the steel in a closed holder in the presence of a substance preparing the metal to be successfully acted on by carbon, and then subjecting the steel to a baking in the presence of carboniferous material, and finally quenching the steel in a bath containing sulfate of lime and ferric oxid mixed with carboniferous material.

3. A process of treating steel for converting it from a low grade to a high grade which comprises the baking of the steel in a closed holder in the presence of hydrated oxid of iron and silica, then subjecting the steel to a baking in the presence of carboniferous material, and finally quenching the steel in a bath.

4. A process of treating steel for converting it from a low grade to a high grade which comprises the baking of the steel in a closed holder in the presence of hydrated oxid of iron and silica, then subjecting the steel to a baking in the presence of carboniferous material, and finally quenching the steel in a bath containing sulfate of lime, ferric oxid and carboniferous material.

5. A process of treating steel for converting it from a low grade to a high grade which comprises the baking of the steel in a closed holder in the presence of hydrated oxid of iron, silica and phosphorus, then subjecting the steel to a baking in the presence of carboniferous material, and finally quenching the steel in a bath.

Signed at New York city, in the county of New York and State of New York, this 16th day of September, A. D., 1909.

LEWIS A. LEONARD.
JESSE P. LARRIMER.

Witnesses:
ARTHUR MARION,
CHAS. C. GILL.